(12) United States Patent
Kiiski et al.

(10) Patent No.: US 7,142,830 B2
(45) Date of Patent: Nov. 28, 2006

(54) ADAPTIVE TRANSCEIVER SYSTEM

(75) Inventors: Matti Kiiski, Oulunsalo (FI); Jyri K. Hämäläinen, Oulu (FI)

(73) Assignee: Nokia Corporation, Espoo (FI)

( * ) Notice: Subject to any disclaimer, the term of this patent is extended or adjusted under 35 U.S.C. 154(b) by 241 days.

(21) Appl. No.: 10/489,673

(22) PCT Filed: Sep. 19, 2002

(86) PCT No.: PCT/IB02/04008

§ 371 (c)(1),
(2), (4) Date: Mar. 16, 2004

(87) PCT Pub. No.: WO03/036817

PCT Pub. Date: May 1, 2003

(65) Prior Publication Data

US 2004/0235512 A1    Nov. 25, 2004

(30) Foreign Application Priority Data

Sep. 19, 2001    (WO) .................. PCT/IB01/01948

(51) Int. Cl.
*H04B 1/04*    (2006.01)
*H04B 1/02*    (2006.01)
*H04B 7/00*    (2006.01)

(52) U.S. Cl. .................. 455/114.2; 455/115.1; 455/120

(58) Field of Classification Search ........... 455/63.1, 455/67.11, 561, 562.1, 272, 276.1, 277.2, 455/91, 114.2, 127.1, 115.1, 103, 120; 375/148, 375/267, 144; 342/380, 383
See application file for complete search history.

(56) References Cited

U.S. PATENT DOCUMENTS

| | | | |
|---|---|---|---|
| 5,767,806 A | | 6/1998 | Watanabe et al. |
| 5,781,845 A | * | 7/1998 | Dybdal et al. .............. 455/65 |
| 5,982,327 A | * | 11/1999 | Vook et al. .............. 342/380 |
| 6,236,839 B1 | | 5/2001 | Gu et al. |

(Continued)

FOREIGN PATENT DOCUMENTS

EP    0 898 174 A1    2/1999

(Continued)

OTHER PUBLICATIONS

Sawahashi et al, "Experiments on adaptive antenna array diversity transceiver for base station application in W-CDMA mobile radio", IN: Antennas and Propagation Society International Symposium, 2000, Jul. 16-21, 2000, vol. 2, pp. 578-582.

(Continued)

*Primary Examiner*—Sonny Trinh
(74) *Attorney, Agent, or Firm*—Squire, Sanders & Dempsey L.L.P.

(57) ABSTRACT

A method for forming signals at a transceiver having at least two transmit and receive chains, the method comprising the steps of: (a) determining the phase difference and relative amplitude of signals from a set comprising a plurality of mobile stations as received through the receive chains, (b) receiving from each of at least one of the mobile stations messages indicative of the strength or quality of signals as received by the respective mobile station from the transceiver and on the basis of those messages determining a phase offset and amplitude distortion, internal to the transceiver, resulting from the differences in the instrumental properties of the receiver and transmitter chains in the transceiver; and (c) transmitting signals from each of the transmitter chains by applying to each transmitter chain amplitude weights and signal delays, selected on the basis of the determined phase offset and amplitude distortion, and received relative amplitudes and phase differences.

24 Claims, 3 Drawing Sheets

U.S. PATENT DOCUMENTS

| | | | |
|---|---|---|---|
| 6,509,872 B1* | 1/2003 | Ishii et al. | 342/383 |
| 6,584,161 B1* | 6/2003 | Hottinen et al. | 375/299 |
| 6,657,590 B1* | 12/2003 | Yoshida | 342/383 |
| 6,778,147 B1* | 8/2004 | Sanada et al. | 343/853 |
| 6,892,059 B1* | 5/2005 | Kim et al. | 455/272 |
| 6,943,627 B1* | 9/2005 | Leyonhjelm et al. | 330/149 |
| 2001/0005685 A1 | 6/2001 | Nishimori et al. | |
| 2002/0094843 A1* | 7/2002 | Hunzinger | 455/562 |
| 2002/0119796 A1* | 8/2002 | Vanghi | 455/522 |
| 2002/0196842 A1* | 12/2002 | Onggosanusi et al. | 375/148 |
| 2003/0017835 A1* | 1/2003 | Bergel | 455/502 |
| 2003/0035490 A1* | 2/2003 | Gollamudi | 375/267 |
| 2003/0148770 A1* | 8/2003 | Das et al. | 455/455 |
| 2004/0233871 A1* | 11/2004 | Seki et al. | 370/331 |
| 2005/0213639 A1* | 9/2005 | Uesugi | 375/146 |

FOREIGN PATENT DOCUMENTS

| | | |
|---|---|---|
| WO | WO 99/09677 | 2/1999 |
| WO | WO 99/57820 | 11/1999 |
| WO | WO 01/67547 A2 | 9/2001 |

OTHER PUBLICATIONS

Harada et al, "Experiment on Adaptive Antenna Array Transmit Diversity in W-CDMA Forward Link", IEICE Trans. Fundamentals, vol. E85-A, No. 7, Jul. 2002, pp. 1612-1623.

* cited by examiner

ADAPTIVE TRANSCEIVER SYSTEM

This invention relates to an adaptive transceiver system. The system is suitably capable of determining transmit weights for multiple transmission chains in accordance with characteristics of received signals, suitably in order to calibrate a unit such as a base station.

In FIG. 1 the principle behind a beamforming antenna system is illustrated. Transmitter 1 is a conventional transmitter. It transmits a radio signal from an antenna 2. The general pattern of the transmitted signal is a lobe shown at 3. Typically the width α of the transmitted beam covers the whole, typically 120' wide, sector. Transmitter 4 is a beamforming transmitter. It includes two antennas 5, 6 each of which transmits signals over a similar lobe 7, 8 covering the whole sector. In the beamforming transmitter the same signal is transmitted from each antenna 5, 6, but the relative phase of the signals is selected so that the signals interfere constructively over a relatively narrow beam 9. By controlling the relative phase and amplitudes of the signals the beam of constructive interference can be directed towards a desired receiver 10. It is emphasized that beamforming provides just an example of adaptive transceiver systems.

In situations where transmitted signals are intended for a single receiver, adaptive systems such as beamforming have significant potential advantages over conventional transmitter systems. Since a greater proportion of the transmitted energy is offered to the receiver, an adaptive system demands less total transmitted power, and causes less interference to other receivers. Furthermore, proposals for the 3G/WCDMA (third generation/wide-band code division multiple access) mobile communication system makes use of multiple antennas to provide an additional diversity.

One situation in which adaptive antennas could be particularly useful is mobile phone systems. Mobile phone basestations transmit signals that are directed to individual mobile terminals. Reducing transmitted power and interference is especially desirable in mobile phone systems because a reduction in expected interference would mean higher network capacity. However, a major difficulty in the implementation of adaptive transmitters at the basestations is the calculation of the relative phase and amplitudes of the signals that must be transmitted from the antennas so as to adapt the transmission to a desired mobile station.

As an example of adaptive antennas, in FIG. 2 a beamforming basestation for a mobile phone system is considered. The basestation includes a pair of antennas 20, 21. Each antenna is connected via a duplexer 22, 23 to a transmit chain 24, 25 and a receive chain 26, 27. The receive chains include a low noise amplifier 28, 29 and a mixer 30, 31 for downconverting the received signal to baseband. In practice two or more downconversion and amplification stages may be employed. The baseband signals are converted to digital form by A-to-D converters 32, 33 for further processing. In the transmission sections a signal for transmission is generated in digital form at 34. The signal is split to the two antennas and converted to analogue by D-to-A converters 35, 36. In the transmit chains the analogue signals for transmission are upconverted by mixers 37, 38 and amplified by amplifiers 39, 40 before being applied to the respective antenna via the duplexers 22, 23. It is noted that in order to keep this example simple only phase control has been considered in FIG. 2. This do not, however, mean that amplitude control would not be applicable. A phase control unit 41 determines the phase offset required to direct a beam to a desired mobile station. The phase control unit forms a phase control signal 42 which is applied to control a phase control unit 43 located in one branch of the digital input. The delay unit inserts a phase offset to antenna 21 so as to cause a phase offset between the signals transmitted from the antennas.

To direct the beam towards a desired mobile station 50 the direction of arrival (DoA) is first estimated by using the signal received from the mobile station and then adjusting the phase offset between the transmission antennas in such a way that a beam is generated in the measured DoA. With two reception antennas the DoA can be estimated from the true phase difference in the signals received from the mobile station by the antennas. However, due especially to imperfections in manufacture of the components of the receive chains 26, 27, to temperature effects and to differences in cable lengths, the measured phase difference and true phase difference differs as the receive chains introduce an additional phase offset into the received signals. Similarly, the measured amplitudes in baseband and true amplitudes are different for both receiving and transmitting chains.

In the following discussion the calibration problems relating to the phase shift and amplitude distortion are explained. To account for the above-mentioned errors the basestation is actively calibrated either continuously or at frequent intervals. In the example of FIG. 2 the calibration is done by injecting a calibration signal into the receive chains from a signal generator 45 and measuring at the control unit 46 the delay introduced into the signal by the receive chains. This yields phase delays $\theta_{RX1}$ for receive (uplink) chain 26 and $\theta_{RX2}$ for receive chain 27. A similar process is applied to the transmit chain using signal generator 44 and phase determination unit 41 to yield delays $\theta_{TX1}$ for transmit (downlink) chain 24 and $\theta_{TX2}$ for transmit chain 25. With this information the control unit can calculate the errors introduced due to differences between the receive and transmit chains: $\Delta\theta_{RX}$ and $\Delta\theta_{TX}$, by:

$$\Delta\theta_{RX} = \theta_{RX1} - \theta_{RX2}$$

and $$\Delta\theta_{TX} = \theta_{TX1} - \theta_{TX2}$$

Here $\Delta\theta_{RX}$ gives the relationship between the true phase difference of the two antennas $\Delta\phi_{RX,TRUE}$ and the respective phase difference measured at the baseband $\Delta\phi_{RX,BB}$:

$$\Delta\phi_{TX,TRUE} = \Delta\phi_{RX,BB} + \Delta\theta_{RX}$$

Typically, in beamforming systems $\Delta\phi_{RX,TRUE}$ is used to estimate the DoA for the respective mobile terminal. Similarly, $\Delta\theta_{TX}$ ties together the phase difference that is imposed on the signal at baseband $\Delta\phi_{TX,BB}$ and the resulting true phase difference $\Delta\phi_{TX,TRUE}$ when the signals leave the antennas, and is given by $$\Delta\phi_{TX,TRUE} = \Delta\phi_{TX,BB} + \Delta\theta_{TX}$$

In beamforming, the value of $\Delta\phi_{TX,TRUE}$ determines in which direction a beam is formed. Typically, both $\Delta\theta_{TX}$ and $\Delta\theta_{RX}$ need to be separately measured by a calibration system in order to base downlink transmission on the uplink measurements.

Consider next the calibration problem corresponding to the amplitude weighting. In the receiver chain the following relationships between the true signal amplitudes $\alpha_{RX1,TRUE}$, $\alpha_{RX2,TRUE}$ in antennas and the measured signal gains $\alpha_{RX1,BB}$, $\alpha_{RX2,BB}$ in baseband are given, $$\alpha_{RX1,TRUE} = \beta_{RX1} \cdot \alpha_{RX1,BB}$$

$$\alpha_{RX2,TRUE} = \beta_{RX2} \cdot \alpha_{RX2,BB}$$

Here $\beta_{RX1}$ and $\beta_{RX2}$ represent the distortion caused by instrumental differences in separate receiver chains. The similar equations are valid also for separate transmit chains. Thus, $$\alpha_{TX1,TRUE} = \beta_{TX1} \cdot \alpha_{TX1,BB}$$

$$\alpha_{TX2,TRUE} = \beta_{TX2} \cdot \alpha_{TX2,BB}$$

However, in calibration of two-antenna system it is enough to control the relative gain between separate transmit chains. For that purpose we write $$\frac{\alpha_{RX1,TRUE}}{\alpha_{RX2,TRUE}} = \beta_{RX} \cdot \frac{\alpha_{RX1,BB}}{\alpha_{RX2,BB}}, \quad \beta_{RX} = \frac{\beta_{RX1}}{\beta_{RX2}}$$

$$\frac{\alpha_{TX1,TRUE}}{\alpha_{TX2,TRUE}} = \beta_{TX} \cdot \frac{\alpha_{TX1,BB}}{\alpha_{TX2,BB}}, \quad \beta_{TX} = \frac{\beta_{TX1}}{\beta_{TX2}}$$

where $\beta_{RX}$ and $\beta_{TX}$ represent the distortions of relative amplitudes in antennas (true value) and baseband. In prior art systems both $\beta_{RX}$ and $\beta_{TX}$ need to be found. Typically this is done by using reference signals which are received from the calibration transmitter and, on the other hand, sent to the calibration receiver.

The complexity of the above-mentioned calibration methods, and the need for frequent calibration of the system makes it costly and clearly more difficult to implement in a practical basestation which employs adaptive antennas. Furthermore, in practice measuring the required phase offsets and amplitude distortions is complicated by the fact that a basestation must be able to communicate with a large number of mobile stations at the same time, which requires that the measurement must not interfere with the normal base station operation.

An alternative system for phase adjustments is described in WO 99/09677. In that system the power or signal quality reported by each mobile station with which the base station is in communication is monitored and used to adjust the transmission phase offset $\Delta\phi_{TX,BB}$ for that mobile station only. In order to operate properly this requires frequent feedback from the mobile station to compensate for the change of feasible phase offset. However, in the GSM system, for example, the feedback rate is only two messages per second which results in slow convergence of the tracking algorithm and limited ability to track the phase offset corresponding to a fast moving mobile terminal. There is therefore a need for an improved adaptive transmitter system.

A related problem arises during the initial configuration of multiple antenna units such as basestations that are capable of beamforming. As indicated above, it is anticipated that transmit diversity will be supported in WCDMA base stations (B nodes). According to the presently proposed WCDMA standards, transmit diversity with two transmit antenna branches in the B node is possible. However, the performance increase resulting from transmit diversity may be seriously impaired if the transmit antenna branches are not well calibrated. Two principal kind of calibration errors may arise. Those are:
 (a) the delay between signals from the separate antennas; and
 (b) the amplitude difference between signals from separate antennas.

Simulations have shown that even a delay of ½ chip between transmitted signals will reduce the link performance of STTD by 0.5 dB in the pedestrian 3 channel. (In the vehicular channel the performance loss is small). In addition, as the delay between signals increases beyond ½ chip, the performance loss is increases rapidly. The effect of amplitude errors has not been well studied, but from theory it is evident that imbalance between transmitted powers will reduce the performance of any transmit diversity scheme.

At present the specifications for acceptable delay and amplitude errors in WCDMA base station products is under discussion in the WCDMA standardization body. A trade-off is having to be made between requiring small error tolerances and permitting loose error tolerances. Requiring small error tolerances would lead to enhanced system performance, but it is anticipated that it would be very costly for manufacturers to produce base station products that meet small error tolerances. This is because it is anticipated that such products would have to undergo a process of accurate calibration in the factory in order to balance the inherent differences in response characteristics between the components of the transmitter antenna branches. On the other hand, permitting loose error tolerances would reduce system performance.

It would therefore be advantageous if it were possible to accurately calibrate a multi-antenna transmitter without expensive factory testing.

According to one aspect of the present invention there is provided A method for delay calibrating a multi-antenna transmitter having at least two transmitter chains each with a respective antenna, the method comprising the steps of:
 (a) transmitting signals to mobile stations by means of the antennas;
 (b) determining feedback data indicative of the relative delay of the transmitted signals; and
 (c) adjusting the delay of one or more of the transmit chains on the basis of the feedback data.

The feedback data could be explicitly or implicitly indicative of the delay.

Further preferred features of the invention are set out in the dependent claims.

The present invention will now be described by way of example with reference to the drawings.

Figure 3:
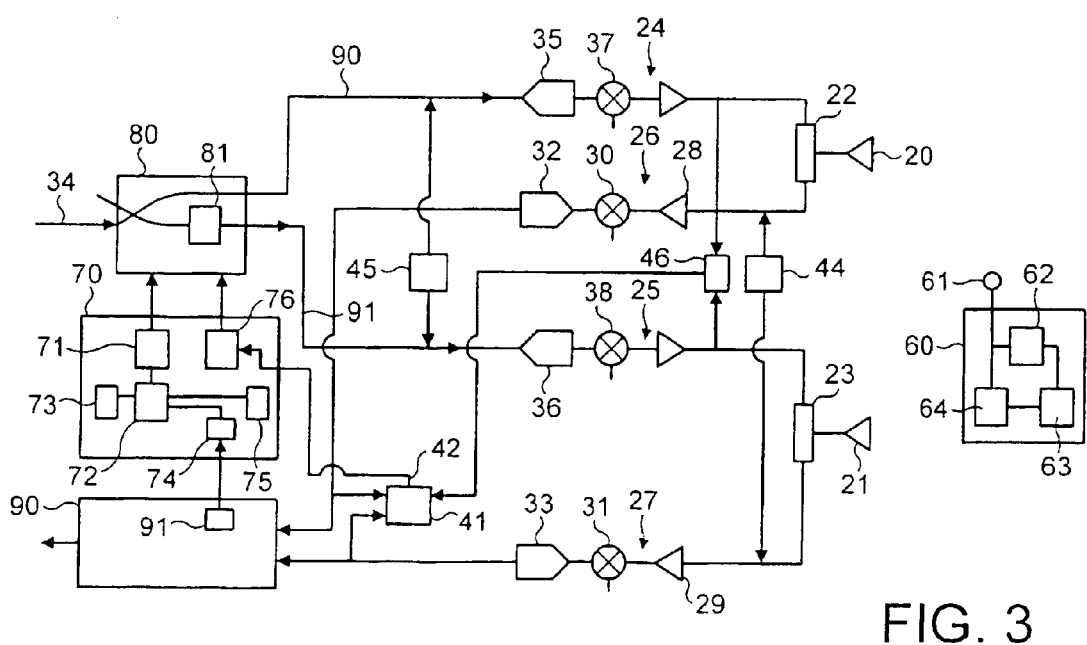
Figure 4:
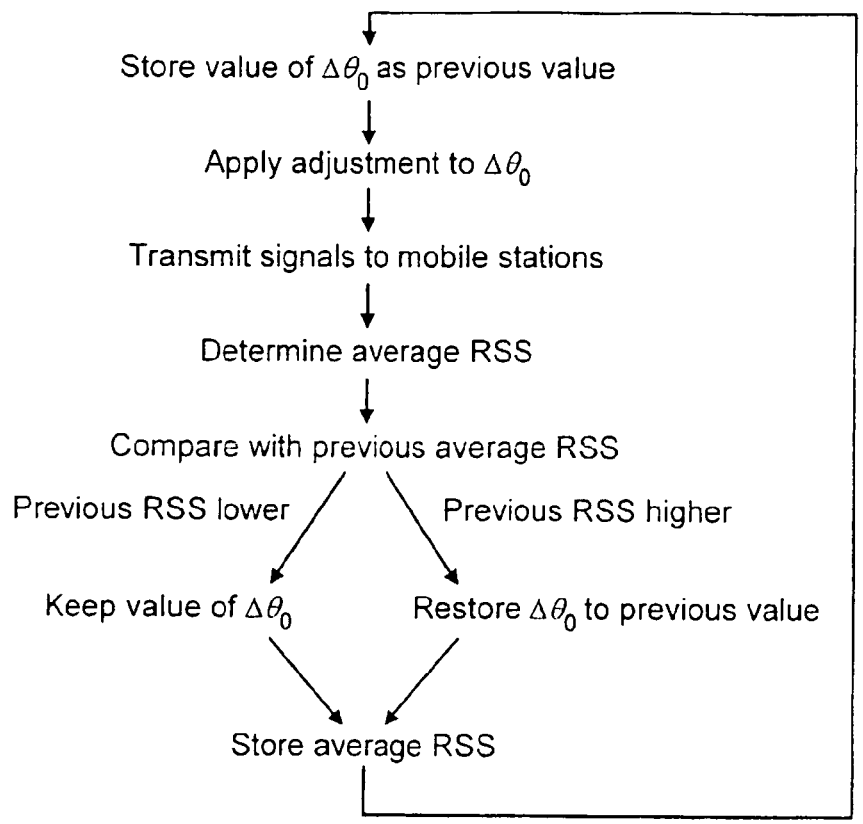
Figure 5:
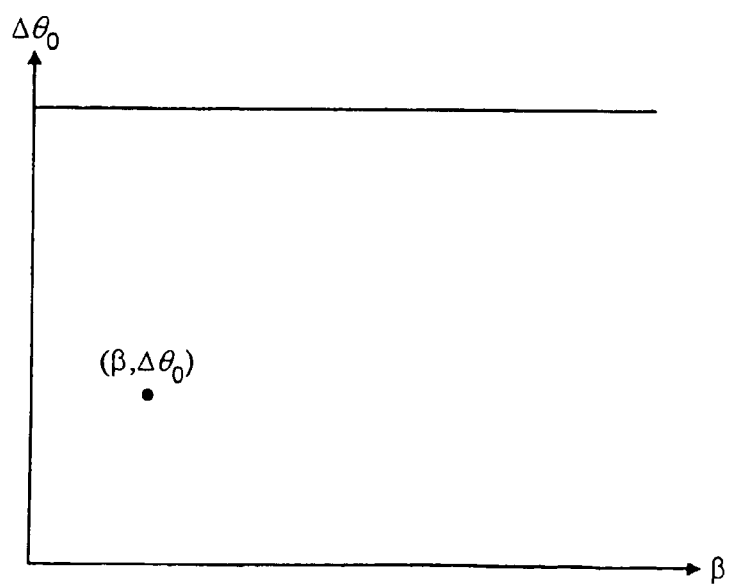

FIG. 3 shows the structure of an example beamforming basestation and a mobile station capable of implementing the present invention FIG. 4 is a flow diagram illustrating an algorithm for performing a method for setting the value of phase offset $\Delta\theta_o$ or distortion $\beta$ of the relative amplitude; and FIG. 5 shows the parameter space from which the values of phase offset $\Delta\theta_o$ and relative distortion $\beta$ of the amplitude are searched.

The inventors of the present invention have observed that even if beamforming is employed, the absolute DoA (direction of arrival) has little importance for directing the transmission beam into the direction of the mobile terminal. Instead of concentrating on indirect measures such as DoA in beamforming, we may require that the following conditions are satisfied:

$$\Delta\phi_{TX,TRUE} = \Delta\phi_{RX,TRUE}, \quad \frac{\alpha_{TX1,TRUE}}{\alpha_{TX2,TRUE}} = \frac{\alpha_{RX1,TRUE}}{\alpha_{RX2,TRUE}}.$$

Hence, only the phase difference and relative amplitude between signals from separate antenna branches form the basis for transmission. Disregarding the small phase error that is caused by the frequency difference between uplink and downlink (especially true when the distance between the antenna elements is small), we may say that, with adequate accuracy, satisfying these conditions will lead to adaptation of downlink transmission to uplink measurements. It should be noted that as part of this invention suitable time averaging can be applied to obtain the measured parameters and that the above condition can be fulfilled on average over any appropriate period of time. It follows that $$\Delta\phi_{TX,BB} + \Delta\theta_{TX} = \Delta\phi_{RX,BB} + \Delta\theta_{RX}, \ \beta_{TX} \cdot \frac{\alpha_{TX1,BB}}{\alpha_{TX2,BB}} = \beta_{RX} \cdot \frac{\alpha_{RX1,BB}}{\alpha_{RX2,BB}}$$

and the phase difference and the relative amplitude to be used at the baseband can be obtained from $$\Delta\phi_{TX,BB} = \Delta\phi_{RX,BB} + \Delta\theta_O, \ \frac{\alpha_{TX1,BB}}{\alpha_{TX2,BB}} = \beta \cdot \frac{\alpha_{RX1,BB}}{\alpha_{RX2,BB}},$$

$$\Delta\theta_O = \Delta\theta_{RX} - \Delta\theta_{TX}, \ \beta = \frac{\beta_{RX}}{\beta_{TX}}.$$

where

A second observation is that the phase offset $\Delta\theta_o$ and the distortion $\beta$ of the relative amplitude are purely instrumental quantities (intrinsic to the related transceiver pair) that change slowly in time, and importantly, are the same for all mobile stations being served by this transceiver pair. If $\Delta\theta_o$ and $\beta$ are determined and tracked by using any mobile station or stations, they can be used to adapt the downlink transmission for any mobile station simply by measuring the phase difference $\Delta\phi_{RX,BB}$ and relative gain $\alpha_{RX1,BB}/\alpha_{RX2,BB}$ in uplink for that mobile station and applying the values of $\Delta\theta_o$ and $\beta$ to obtain the values $\Delta\phi_{TX,BB}$ and $\alpha_{TX1,BB}/\alpha_{TX2,BB}$ to be used for that mobile station.

A third observation is that $\Delta\theta_o$ and $\beta$ can be determined and tracked by using any mobile station being served by the transceiver pair. For this it is required that the mobile station is capable of transmitting to the transceiver reporting messages indicative of the strength or quality of signals received by the terminals from the transceiver. These messages are used to adjust estimates of the values $\Delta\theta_o$ and $\beta$ in such a way that the true value with adequate accuracy follows.

FIG. 5 shows the parameter space and a certain parameter point ($\beta$, $\Delta\theta_0$). In calibration the aim is to find a point ($\beta$,$\Delta\theta_0$) such that the strength or quality of signals received by mobiles is maximized. It is important to note that ($\beta$,$\Delta\theta_0$) maximize the strength or quality of signals received by mobiles is the same for all mobiles. This two-dimensional optimisation problem can be solved in practice, for example, by reducing it into two consecutive one-dimensional problems. Hence, $\beta$ is first fixed and best value for $\Delta\theta_0$ is searched using method proposed in FIG. 4. Then $\Delta\theta_0$ is fixed and best value for $\beta$ is searched using method of FIG. 4. This process is continued until feasible values for both $\Delta\theta_0$ and $\beta$ are found. It is remarked that the method of FIG. 4 is applicable when best values for both $\Delta\theta_0$ and $\beta$ are searched. There exist many possible alternatives how to determine and track $\Delta\theta_0$ and $\beta$ which can be implemented within the scope of the present invention.

Figure 1:
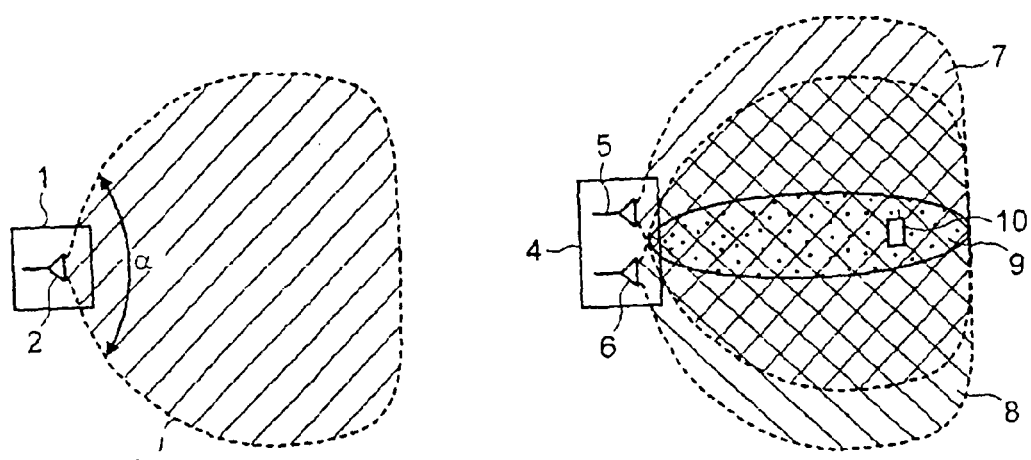
FIG. 1 illustrates conventional and beamforming transmitter systems.
Figure 2:
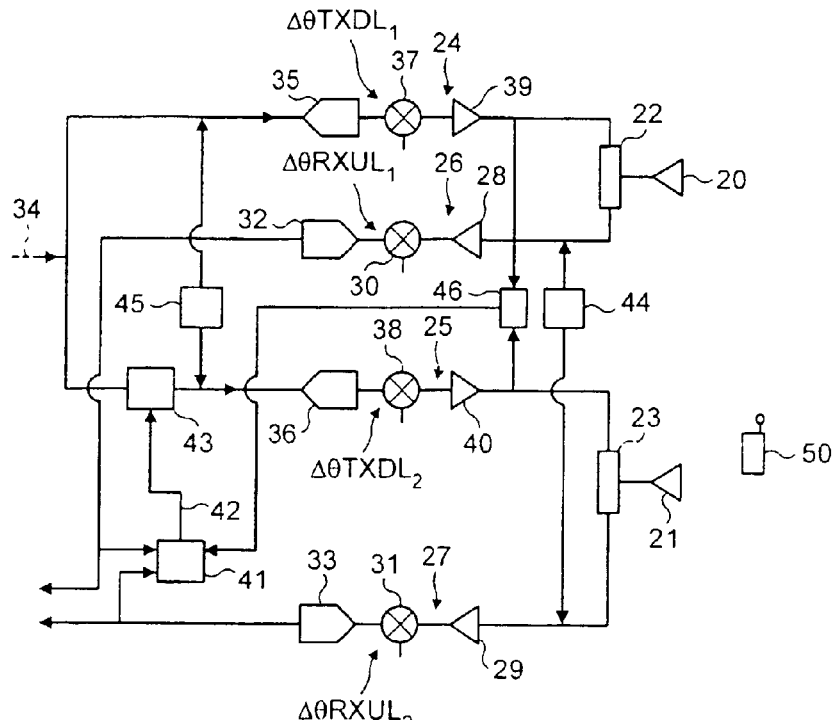
FIG. 2 shows the structure of an example beamforming basestation.

In FIG. 3 like components are numbered as in FIG. 2.

The basestation of FIG. 3 is a beamforming basestation. The mobile station 60 has an antenna 61, a received signal strength or quality measurement unit 62 coupled to the antenna for measuring the received signal strength (RSS) or quality and reporting it to a control unit 63, and a transmission signal generation unit 64 also coupled to the antenna for generating signals for transmission under the control of the control unit 63. The basestation has a signal strength or quality report processing unit 70 which decodes the signal strength or quality reports received by the base stations and processes them accordingly. Many communication systems require mobile stations to be capable of reporting received signal strength or quality to the basestation. Examples are GSM (Global System for Mobile Communications) and UMTS (Universal Mobile Telecommunications System). The principles behind measurement of received signal strength or quality, encoding signals strength or quality reports at mobile stations and decoding them at the base station are well known.

The system of FIG. 3 uses the assumption that within a small period of time differences in the transmit and receive chains will have the same effect for communications between the base station and all the mobile stations with which it communicates. Thus during that period $\Delta\theta_o$ can be assumed to be the same for communications with all mobile stations.

During operation of the system of FIG. 3 a current value of $\Delta\theta_o$ is stored by control unit 70. The determination of that value is discussed below. When a signal from a mobile station is received the phase difference $\Delta\phi_{RX,BB}$ between the signals received from that mobile station via the two antennas is determined at control unit 80. A phase difference $\Delta\phi_{TX,BB}$ is applied to signals for transmission to that mobile station. $\Delta\phi_{TX,BB}$ is calculated by:

$$\Delta\phi_{TX,BB} = \Delta\phi_{RX,BB} + \Delta\theta_o$$

This expression holds for all mobile stations.

Once an initial value of $\Delta\theta_o$ has been determined, an iterative process is performed to update the value, initially to improve its accuracy, and then to cope with temperature and other environmental variations. In each step of the iterative process a modification is made to the value of $\Delta\theta_o$. The averages of the reported received signal strengths or qualities from each of the mobile stations to which the base station transmits before and after the modification are compared. If the average is greater after the modification then the modification is taken to have resulted the value of $\Delta\theta_o$ more accurately reflecting the differences introduced by the basestation hardware. In that case the modified value of $\Delta\theta_o$ is kept as a starting value for the next iteration. Otherwise, $\Delta\theta_o$ is restored to its value before modification as the starting value for the next iteration. Other methods could be used to adjust $\Delta\theta_o$.

The iterative process is illustrated in FIG. 4.

FIG. 3 shows details of the components used in the control unit 70 to perform the process. The value of $\Delta\theta_o$ is stored in store 71. Store 71 is available to the transmission section 80 of the basestation for forming signals for transmission to mobile stations. A new value of $\Delta\theta_o$ is formed in calculation unit 72. The old value of $\Delta\theta_o$ is stored in backup store 73 and the new value of $\Delta\theta_o$ is stored in store 71. Signals are transmitted to the mobile stations using the value of $\Delta\theta_o$ stored in store 71. Measurement reports from mobile stations are detected by a signal monitor 91 in the decoding section 90 of the basestation and passed to an averaging unit 74 which forms an average of the reports received over a predetermined time period. That new average is compared by the controller 72 with the previously determined average which has been stored in store 75. If the new average is greater then the value of $\Delta\theta_o$ stored in store 71 is left unchanged. Otherwise, the value of $\Delta\theta_o$ is restored to the old value of $\Delta\theta_o$ as stored in backup store 73. The newly determined average is then loaded into store 75 for use in the next iteration.

The control unit 70 also includes a set of stores 76 each of which stores the value of $\Delta\phi_{RX,BB}$ for a respective mobile station. The stores 76 are accessible to the transmission unit 80 for use in forming transmissions to the mobile stations.

In forming a transmission to a mobile station the transmission unit 80 receives a signal for transmission at 34. It applies that signal to the transmission input 90 of the first transceiver unit 24, 26 etc. It also applies the signal from phase shifter 81 to the transmission input 91 of the second transceiver unit 24, 26 etc. The phase shift applied by the phase shifter 81 is determined as described above using the value of $\Delta\theta_o$ derived from store 71 and the appropriate value of $\Delta\phi_{RX,BB}$ derived from store 76. The appropriate value of $\Delta\phi_{RX,BB}$ is the value of $\Delta\phi_{RX,BB}$ for the mobile station to which the signal is to be directed. The identity of that mobile station may be determined by the transmission unit 80 from the content of the signal itself, or from a separate signal it receives.

Conveniently, the RSS is reported by the mobile stations according to the normal means as required by the standard to which they operate. Thus GSM mobile stations will typically provide reports of RSS around twice each second, whereas UMTS mobile stations will typically provide very frequent reporting. If the RSS reports are very frequent then it may be preferable to average them over time in order to remove the effect of fast fades.

In order to determine the average RSS for use in refining the value of $\Delta\theta_o$ the base station could use RSS reports from all of the mobile stations that report to the base station on the power received from that base station (all the mobile stations connected to that base station). Alternatively, just a subset of those mobile stations could be used in order to make the process of determining the average RSS quicker. Reports from a single mobile station could be used if desired.

In order to determine whether the average RSS has risen or fallen as a result of an adjustment of the value of $\Delta\theta_o$, all the reported RSS values could be averaged at each iterative step and the values reported at successive steps compared with each other. Alternatively, the system could determine whether the majority of individual RSS values from each mobile station have resin or fallen as a result of the adjustment. Other schemes could also be used.

When the value of $\Delta\theta_o$ that is to be used for communications with all mobile stations is known, it is very straight-forward for the basestation to begin beamforming to a mobile station that has newly attached to the basestation. All that is needed is for the control unit 80 to measure the difference in phase between signals received from the base station via the two antennas of the basestation and to use that difference as the value of $\Delta\phi_{RX,BB}$ for communications with that mobile station. In a typical basestation the phase difference can conveniently be measured at baseband. The value of $\Delta\phi_{RX,BB}$ can be measured each time a communication is received from a mobile station, or periodically. The preferred interval for measuring $\Delta\phi_{RX,BB}$ will depend on the width of the beam formed by the antennas, the sensitivity of the mobile station and the expected maximum speed of the mobile station. The measured value of $\Delta\phi_{RX,BB}$ may be averaged over a short timebase to give a working value of $\Delta\phi_{RX,BB}$. The control unit 80 conveniently stores values of $\Delta\phi_{RX,BB}$ to be used for communications with each mobile station attached to the base station so that signals can be beamformed to the mobile stations with little delay.

Using the same value of $\Delta\theta_o$ for communications with all mobile stations may be expected to involve some additional error over a system in which individual values of $\Delta\theta_o$ are used for each mobile station, due to differences in frequency between the transmit and receive signals and due to differences between the signals to and from the different mobile stations. Since there is a spacing between the two antennas the path lengths between a mobile station and each antenna will normally be different and there will be therefore be a frequency-related component in the phase offset as received at the antennas. However, in most systems the relative frequency difference between uplink and downlink signals will be small—typically less than 10%. Therefore, the beamforming capability of a system as described above is unlikely to be hindered significantly by those errors. In addition, error can be reduced by closer spacing of the antennas; preferably the antennas are set at a spacing of $\frac{1}{2}\lambda$, where $\lambda$ is the typical wavelength at which the system is to operate.

When the process described above is initiated, an initial value of $\Delta\theta_o$ must be selected. The initial value of $\Delta\theta_o$ may be preset in the base station, determined randomly or determined by internal calibration using signal generators 44, 45 in the base station as discussed above with reference to FIG. 2 and using the equation $\Delta\theta_o = \Delta\theta_{RX} - \Delta\theta_{TX}$.

The modification of the value of $\Delta\theta_o$ at each iteration may be performed according to standard techniques for iterative optimisation of feedback parameters. For example, at each iteration a predetermined small offset $\delta$ could be applied to the starting value of $\Delta\theta_o$ for that iteration. $\delta$ could be added or subtracted in alternate iterations, or could be applied with the same sign as in the previous iteration if the previous iteration resulted in a change in the value of $\Delta\theta_o$ or with the opposite sign if the previous iteration resulted in the value of $\Delta\theta_o$ remaining unchanged.

The application of the above principles to the calibration of devices such as base stations for reduction of errors due to delay will now be described.

As discussed above, due to differences between the characteristics of the hardware that makes up the transmit antenna branches of a multi-antenna base station, there can be differences in delay between the branches. These mean that the branches impose different delay on transmitted signals. In the case of WCDMA these differences in time delay mean that the spreading codes of signals transmitted to different mobile stations may no longer be truly orthogonal, resulting in intra-cell downlink interference that can reduce downlink signal-to-noise ratio and therefore available data rate. In beamforming applications, differences in delay may mean that the beams are not optimally formed. One option for overcoming this is to accurately calibrate the base station at the factory, but this requires extensive testing and adjustment which increases the cost of the equipment. Also, with this means of calibration alone, if calibration is later lost for some reason the performance of the base station is degraded; and if projected dual-antenna features that will need still more accurate calibration are introduced, then complicated changes may be required.

The principles described above can be used to enable open- and/or closed-loop calibration during operation of the base station. This may be supplemented by some initial, possible quite loose, calibration at the factory before a base station is shipped.

Closed-loop calibration involves calibrating the base station based on reports received from mobile stations (or dedicated monitoring units) during the operation of the base station. The mobiles should be able to directly or indirectly estimate the parameters that need to be calibrated. The results of that estimation is fed back to the base station, where it is input to a calibration unit which, based on that information, can alter the parameters of at least one of the antenna branches so as to improve the branches' calibration. In this way the calibration can be improved during operation, although there is some increase in signalling overhead since the mobile stations must signal the results of their estimations to the base station. This data is preferably signalled directly, over the radio uplink from the mobile stations to the base station.

It is preferred that there is some initial calibration at the factory, so as to ready the base station for satisfactory (even if marginal) use in the field. The accuracy of the initial calibration can, for instance, be +/−1 chip. The mobile station (or user equipment UE) measures delay and amplitude differences between pilot signals transmitted by the base station. This is possible since separate antenna branches use orthogonal P-CPICHs. In practice, the delay between signals can be estimated if channel taps corresponding to separate signals are tracked simultaneously. After computing the instant time delay and amplitude difference, the UE can estimate the average time delay and amplitude difference using simple FIR or IIR filters. To reduce the bandwidth required for reporting, the result concerning to time delay can be quantized, for example, as follows

| Time Delay [chip] | −1.0 | −0.5 | −0.25 | −0.125 | +0.125 | +0.25 | +0.5 | +1.0 |
|---|---|---|---|---|---|---|---|---|
| Coding | 111 | 011 | 001 | 101 | 010 | 110 | 100 | 000 |

On top of this coding, some stronger binary code can be employed. This calibration information can be included into the measurement report that is send to the base station.

At the base station, feedback information from several mobiles is combined. We can compute, for example 1. Average feedback over all mobiles
2. Weighted average feedback over all mobiles
3. Weighted average feedback over some mobiles.

As appropriate.

In all cases time averaging (filtering) is also employed. If only some of the mobiles are selected into the calibration process, then the selection criteria can be based on the any parameter known from the measurement report or uplink measurements. In order to guarantee the quality of calibration, other statistical measures beside the average can be computed. We can, for example, compute the variance from obtained calibration information and estimate the confidence level of the calibration estimate. If estimate is not reliable enough, then it is rejected.

Another form of calibration, which may be used in addition to or instead of closed-loop calibration is open-loop calibration. Again, there is preferably at least a loose initial calibration made at the factory. Then more accurate calibration is achieved during operation based on indirect measures. By 'indirect measures' is meant any information that may already be available concerning to system performance. These measures may be, for example, the needed transmit power in base station, filtered power control commands received from mobiles or any combination of parameters available from the measurement reports that mobile stations are to send (according to present standards in systems such as WCDMA) to base stations. This method has the advantage that it does not require changes to the present standards.

In the open-loop system the accuracy of the initial calibration can be again +/−1 chip. The basic idea is that loose calibration is seen as a system performance loss when compared to accurately calibrated system. One method of open-loop calibration is as follows:

1. Measure the system performance using available parameters and statistical methods.
2. Change the delay and/or amplitude calibration slightly.
3. Measure again the system performance using the same parameters and statistical methods as in stage 1.
4. Compare results and decide whether the change in calibration parameters has improved the system performance or not. Based on the result of this determine a new change to be applied, and return to step 2.

This scheme widely applicable since many alternative detailed embodiments are possible. One could, for example, estimate the average transmit power per chip over all mobiles during a certain time interval and after the change of calibration parameters the same measure is estimated. If performance is improved, then the change is assumed to have been in the right direction and is accepted. Otherwise, the change is reversed, or another change made in the contrary direction. Other performance measures beside the average transmit power can be used. It should be noted that it is preferable:

- To keep the change of calibration parameters small. In this way problems arising from lost performance can be minimised.
- That the time averaging period of the performance measures should be long enough. Time averaging may last even days.
- That the averaging periods should be as similar as possible from a traffic condition point of view.
- That other statistical parameters beside the average are computed. In this way one can confirm that estimated averages are reliable.
- That beside the average transmit power/chip other measures such as parameters reported by UE can be employed.

The above systems can also work as a backup if the initial factory calibration is not valid, or is violated for some reason.

The above systems are not limited to mobile telephony base stations.

The present invention may be applied to any adaptive transceiver systems that use co-polarisation antennas or that use antennas of different polarisation.

The present invention may be applied to systems that transmit using more than two antennas. In such a case the phase differences caused by the transmit and receive chains associated with one antenna and those associated with each other antenna should be determined. This can still be done using an iterative process based on the average reported RSS.

The mobile station could be a mobile phone. The mobile station need not actually be mobile: it could be fixed in location. The mobile station may be termed a terminal.

The basestation and the mobile station are suitable operable according to any suitable protocol, for example GSM, UMTS (3G) or a derivative thereof.

The applicant draws attention to the fact that the present inventions may include any feature or combination of features disclosed herein either implicitly or explicitly or any generalisation thereof, without limitation to the scope of any definitions set out above. In view of the foregoing description it will be evident to a person skilled in the art that various modifications may be made within the scope of the inventions.

The invention claimed is:

1. A method for delay calibrating a multi-antenna transmitter having at least two transmitter chains each with a respective antenna, the method comprising iteratively performing the steps of:
   (a) transmitting signals to mobile stations by means of the antennas;
   (b) determining feedback data indicative of the relative delay of the transmitted signals; and
   (c) adjusting the delay of one or more of the transmit chains on the basis of the feedback data.

2. A method as claimed in claim 1, wherein the signals are transmitted in the course of traffic communications with the mobile stations.

3. A method as claimed in claim 2, wherein the signals are traffic signals.

4. A method as claimed in claim 1, wherein the said determining step comprises:
   measuring at one or more of the mobile stations one or more characteristics of one or more of the signals; and
   reporting the results of that measurement as feedback data to the multi-antenna transmitter.

5. A method as claimed in claim 4, wherein the characteristics include one or more of signal strength and signal quality.

6. A method as claimed in claim 5, wherein the signal strength is represented by signal to interference ratio.

7. A method as claimed in claim 5, wherein the signal quality is represented by transport channel block error rate.

8. A method as claimed in claim 4, wherein the step of measuring comprises measuring at more than one of the mobile stations one or more characteristics of one or more of the signals; and the step of adjusting comprises averaging the feedback data over a predetermined period to determine an averaged measurement result, and adjusting the delay of one or more of the transmit chains on the basis of the averaged measurement result.

9. A method as claimed in claim 8, wherein the predetermined period is longer than one hour.

10. A method as claimed in claim 8, wherein the predetermined period is longer than 24 hours.

11. A method as claimed in claim 1, wherein the said determining step comprises:
    measuring at the transmitter one or more characteristics of one or more of the signals; and
    the feedback data comprises the results of that measurement.

12. A method as claimed in claim 11, wherein the said characteristics measured at the transmitter include one or more of total transmit power and average transmit power per chip over a predetermined period.

13. A method as claimed in claim 1, wherein the said determining step comprises:
    measuring at one or more of the mobile stations one or more characteristics of one or more of the signals;
    reporting the results of that measurement to the multi-antenna transmitter;
    measuring at the transmitter one or more characteristics of one or more of the signals;
    and forming the feedback data based on both of the said measurements.

14. A method as claimed in claim 13, wherein the step of forming the feedback data based on both of the said measurements comprises comparing the results of the both of said measurements and forming the feedback data so as to be representative of the relative delay as indicated by both of the said measurements.

15. A method as claimed in claim 1, wherein the said transmitting, determining and adjusting steps are performed repeatedly so as to reduce differences in the instrumental properties of the transmitter chains in the transceiver.

16. A method as claimed in claim 1, comprising adjusting at least one other characteristic of the transmitter based on the feedback data.

17. A method as claimed in claim 16, wherein the other characteristic is the power of a signal to be transmitted to at least one of the mobile stations.

18. A method as claimed in claim 1, comprising adjusting the relative amplitude of signals to be transmitted by one or more of the transmit chains on the basis of the feedback data.

19. A method as claimed in claim 1, comprising adjusting the relative phase of signals to be transmitted by one or more of the transmit chains on the basis of the feedback data.

20. A method as claimed in claim 1, wherein the transmitter is a base station.

21. A method as claimed in claim 1, wherein the transmitter and the mobile stations are operable according to the 3G telecommunication protocol.

22. A method as claimed in claim 1, wherein the transmitter is a beamforming transmitter.

23. A method as claimed in claim 1, wherein the transmitter is a space-time coding transmitter.

24. A communication system comprising a multi-antenna transmitter having at least two transmitter chains each with a respective antenna, and a plurality of mobile stations, wherein the system is arranged to perform delay calibration of the transmitter by iteratively performing the steps of:
    (a) transmitting signals to mobile stations by means of the antennas;
    (b) determining feedback data indicative of the relative delay of the transmitted signals; and
    (c) adjusting the delay of one or more of the transmit chains on the basis of the feedback data.

* * * * *